Figure 1:
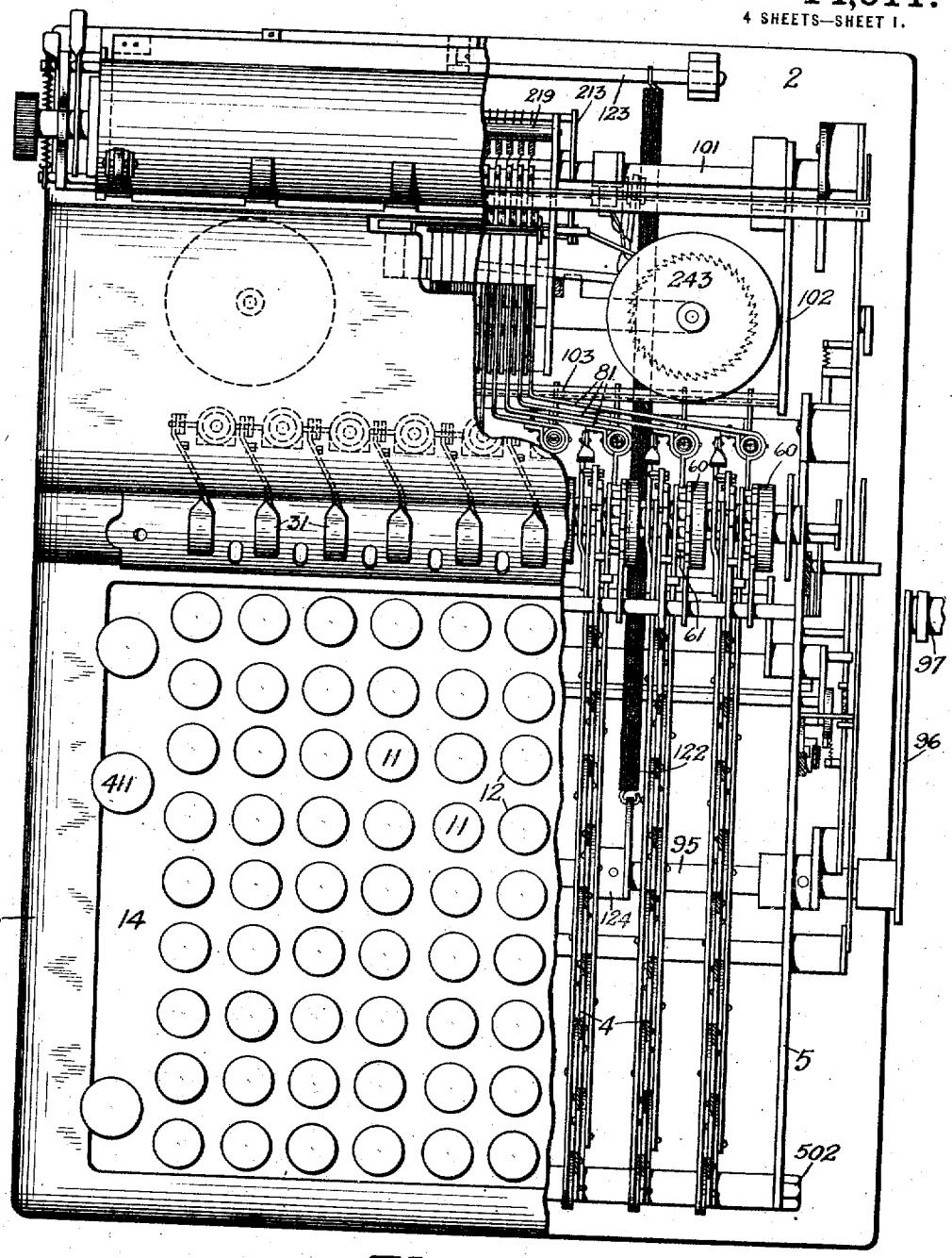

J. C. LOTTERHAND, DEC'D.

ADDOMETER CORPORATION, ASSIGNEE.

PRINTING MECHANISM FOR ADDING MACHINES.

APPLICATION FILED SEPT. 15, 1915.

Reissued Nov. 16, 1915.

14,011.

4 SHEETS—SHEET 1.

Inventor
J.C. Lotterhand.
deceased
By Addometer Corporation assignee
William H. Reid Atty

J. C. LOTTERHAND, DEC'D.

ADDOMETER CORPORATION, ASSIGNEE.

PRINTING MECHANISM FOR ADDING MACHINES.

APPLICATION FILED SEPT. 15, 1915.

Reissued Nov. 16, 1915. 14,011.

4 SHEETS—SHEET 2.

Inventor

J. C. Lotterhand.

By Addometer Corporation, deceased, Assignee.

William A. Reid, Atty.

J. C. LOTTERHAND, DEC'D.
ADDOMETER CORPORATION, ASSIGNEE.
PRINTING MECHANISM FOR ADDING MACHINES.
APPLICATION FILED SEPT. 15, 1915.

Reissued Nov. 16, 1915.

14,011.

4 SHEETS—SHEET 3.

Inventor
J. C. Lotterhand
deceased
By Addometer Corporation, assignee
William H. Reid, Atty J. C. LOTTERHAND, DEC'D.
ADDOMETER CORPORATION, ASSIGNEE.
PRINTING MECHANISM FOR ADDING MACHINES.
APPLICATION FILED SEPT. 15, 1915.

Reissued Nov. 16, 1915. 14,011.

4 SHEETS—SHEET 4.

Inventor
J. C. Lotterhand.
By Addometer Corporation, deceased, assignee
William A. Ford
Atty.

UNITED STATES PATENT OFFICE.

JASON C. LOTTERHAND, DECEASED, LATE OF NEW YORK, N. Y., BY ADDOMETER CORPORATION, OF DOVER, DELAWARE, A CORPORATION OF DELAWARE, ASSIGNEE.

PRINTING MECHANISM FOR ADDING-MACHINES.

Specification of Reissued Letters Patent. Reissued Nov. 16, 1915.

14,011.

Original No. 1,069,152, dated August 5, 1913, Serial No. 440,399. Reissue No. 13,781, dated July 28, 1914, Serial No. 840,643. This application for reissue filed September 15, 1915. Serial No. 50,912.

*To all whom it may concern:*

Be it known that JASON C. LOTTERHAND, deceased, a citizen of the United States, and late a resident of New York, in the county and State of New York, did invent certain new and useful Improvements in Printing Mechanism for Adding-Machines, of which the following is a specification.

This invention relates to adding machines and more particularly to the printing or recording mechanism thereof and its novelty consists in the construction and adaptation of the parts as will be more fully hereinafter pointed out.

In an application for Letters Patent of the United States filed by said Lotterhand on the 24th of February, 1908, Serial No. 417,352, is explained the subject matter of this application in connection with the accumulating and calculating mechanism used therewith and this application is divided out of the one referred to at the request of the Patent Office.

In order to understand the construction and mode of operation of the printing mechanism hereinafter described, it is necessary to understand the construction and mode of operation of the coöperating mechanism and therefore there is described in this application much which will be found in the prior application, but such repetition is necessary.

One of the objects of the present invention is to provide an improved form of construction of the devices by which the several type carriers, after being positioned according to the keys depressed, are caused to make the impression on the printing surface.

Another object of the invention is to provide an improved construction of the members usually known as the rack and type plates.

A further object of the invention is to provide an improved member that will coöperate with the printing means for the purpose of preventing the type carriers to be engaged or propelled to print during the operation of the machine after the keys have been depressed, so that while the accumulating mechanism will operate in its usual manner, no printing operation will take place.

Another object of the invention is to provide an improved form of means for shifting the printing ribbon to and from the printing position between the platen and the type on the positioned type carriers.

Figure 2:
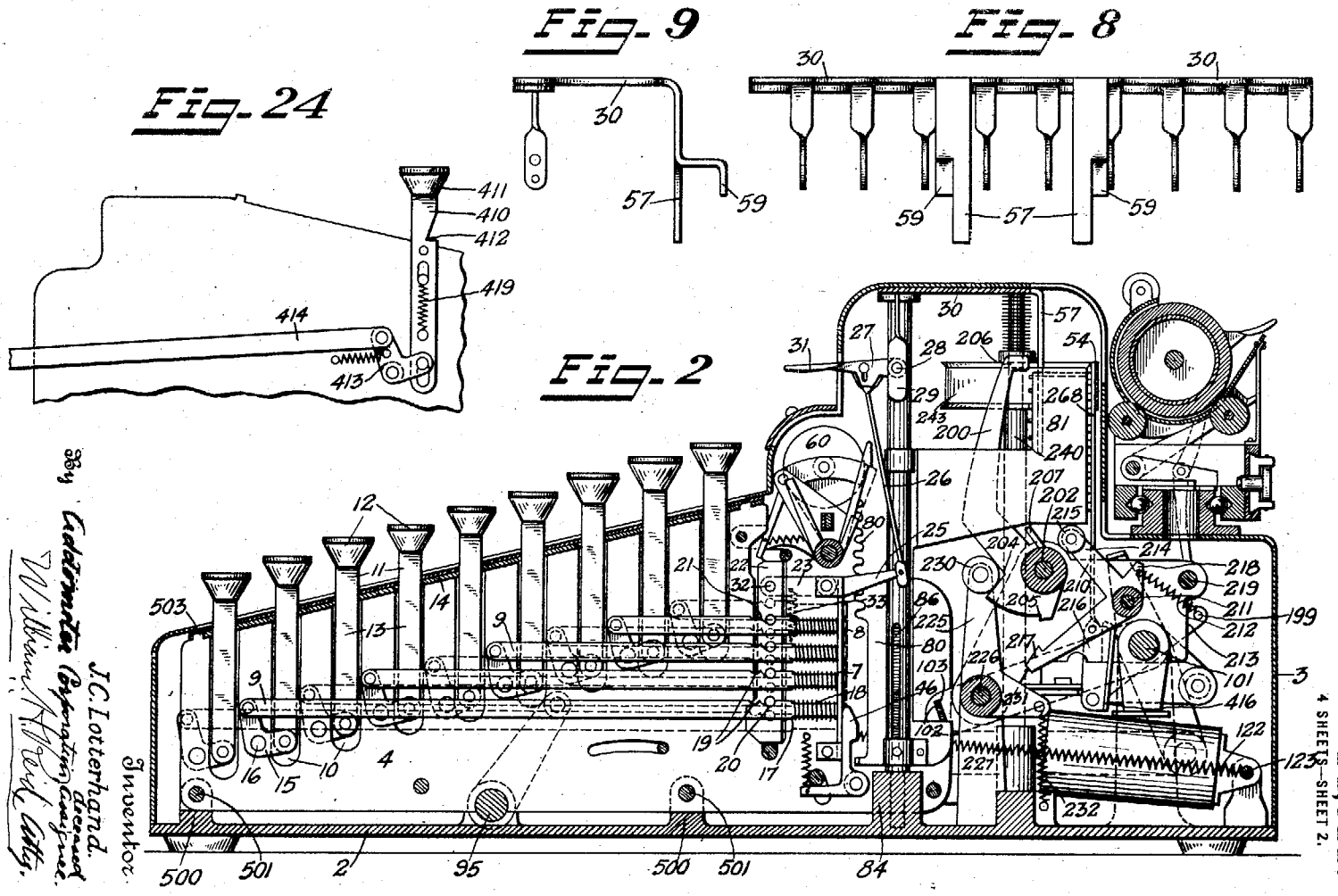
Figure 3:
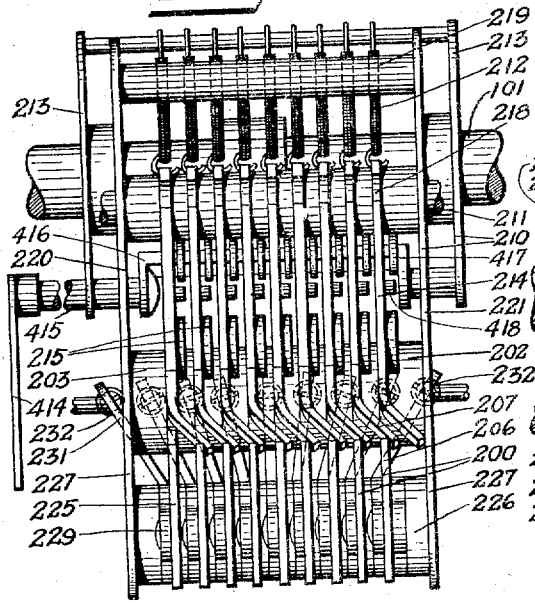
Figure 4:
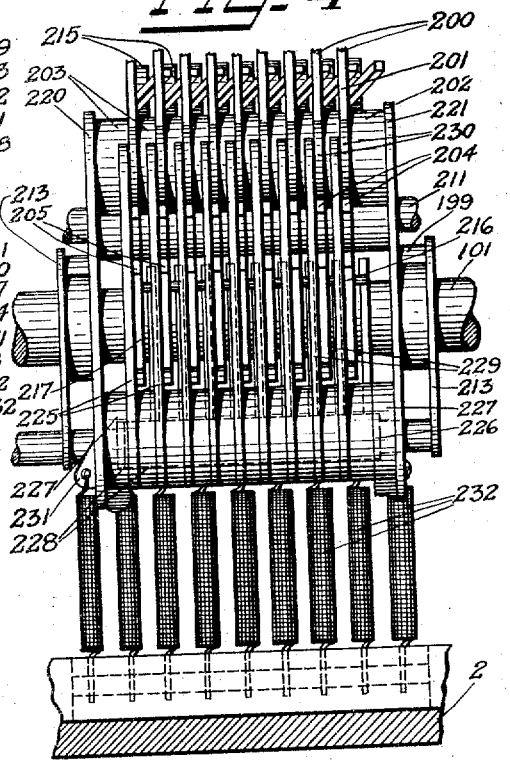
Figure 23:
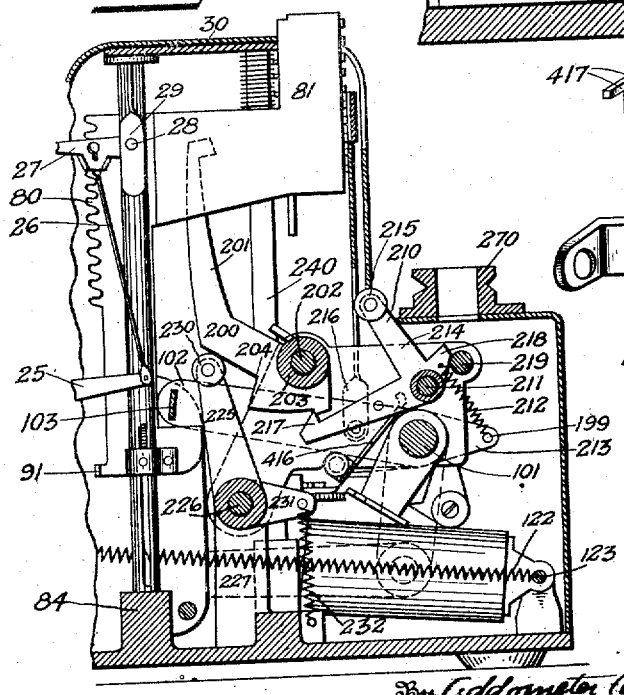
Figure 10:
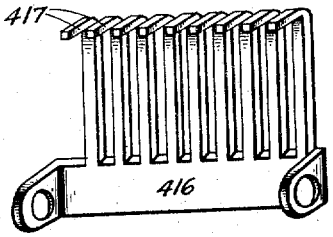
Figure 11:
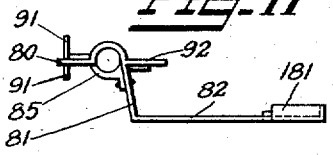
Figure 13:
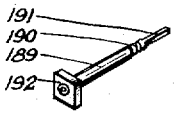
Figure 16:
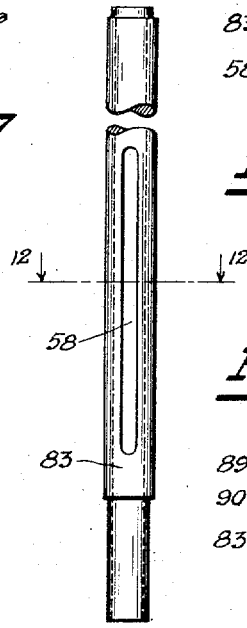
Figure 12:
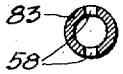
Figure 18:
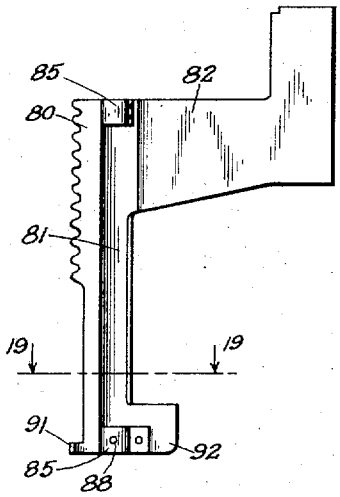
Figure 17:
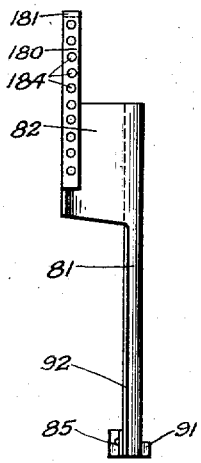
Figure 14:
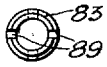
Figure 15:
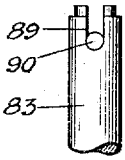
Figure 20:
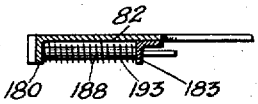
Figure 5:
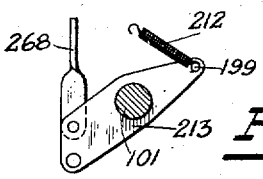
Figure 19:
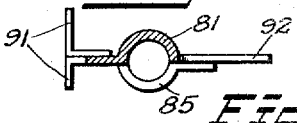
Figure 7:
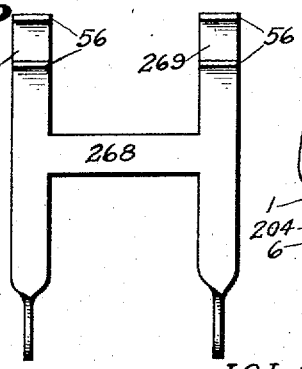
Figure 6:
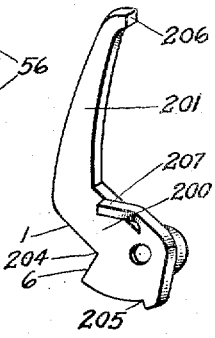
Figure 21:
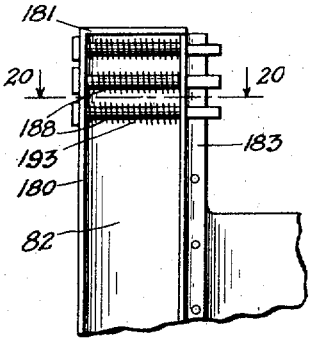
Figure 22:
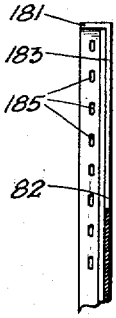

In the accompanying drawings illustrating embodiments of this invention, Figure 1 is a plan view of the device, with the cover or casing broken away to show mechanism below the same. Fig. 2 is a side elevation of the parts with the handle omitted and the casing broken away. Fig. 3 is an enlarged plan view of the printing mechanism, and Fig. 4 is a front elevation of the same parts. Fig. 5 is a side elevation of one of the brackets that shift the ribbon. Fig. 6 shows a type actuator. Fig. 7 shows the ribbon shifter. Fig. 8 shows a supporting plate at the top of the machine for certain parts. Fig. 9 is a side view of the plate shown in Fig. 8. Fig. 10 shows a multiple detent member. Fig. 11 is a plan view of a rack and type plate. Fig. 12 is a section on the line 12—12 of Fig. 16. Fig. 13 is a view of a type member. Fig. 14 is a plan view of the guide post. Fig. 15 shows the upper part of the guide post, and Fig. 16 is a side elevation of the same. Fig. 17 is a rear elevation, and Fig. 18 a side elevation of a rack and type plate. Fig. 19 is a section on the line 19—19 of Fig. 18. Fig. 20 is an enlarged section on the line 20—20 of Fig. 21. Fig. 21 is a side elevation enlarged of an upper portion of a rack and type plate. Fig. 22 is a front elevation of the same parts. Fig. 23 is a side elevation of the rear portion of the machine similar to Fig. 2. Fig. 24 shows a portion of the means for operating the multiple detent.

In the drawings, the parts are shown in Fig. 2 mounted upon and within the framework comprising a base plate 2 and an outer upper casing 3 completely enveloping the machine and suitably apertured to permit of the passage of some of the parts. It is provided with a series of vertically arranged upwardly projecting plates 4 adapted to serve as supports for the key system and with two other similar plates 5 to support other parts, as hereinafter described. Each of these plates 4 and 5 are mounted in slots formed in transverse ribs 500 made integral with or secured to the base of the machine. Each rib is longitudinally apertured and when the plates are in position a retaining bolt 501 is passed through such apertures and also through apertures in the plates registering therewith and a nut 502 engaging the end of the bolt holds the plates firmly in position. Each of these plates at its upper edge is provided with two projections 503 adapted to engage with suitable slots in the key plates 4 hereinafter referred to. Each plate 4 at its rear end is provided with a transverse guide plate 7 having right angled apertures 8 to permit of the passage of the stop bars 9 hereinafter mentioned. Each plate 4 is also provided with a series of recesses 10 to receive the key stems hereinafter referred to.

Projecting upwardly through the casing 3 are the keys 11, arranged in denominational series in the usual manner, each provided with a finger piece 12 and with a depending stem 13 adapted to reciprocate in one of the recesses 10 of the plate 4 immediately beneath it and guided by an aperture in the upper key plate 14 through which it passes and by its recess 10, the bottom of this recess serving to limit its downward movement. At its bottom, each stem 13 is hinged to one end of an elbow lever 15 pivoted at 16 to the plate 4, the other end of which lever is hinged to a horizontal stop bar 9, the rear end of which passes through the aperture 8 provided for that purpose in the guide plate 7. Each bar 9 is reduced in cross section at the rear of a shoulder 17 and a retracting spring 18 is placed around the end of the bar and between this shoulder 17 and the transverse guide plate 7. Each bar is provided on its upper edge with two adjacent notches 19 and 20, on each side of a summit 21 common to both. The elbow levers 15 and the stop bars 9 are arranged alternately on opposite sides of the plate 4 common to each series. Each series of keys is provided with a latch bar 22 vertically suspended in a recess in the plate 4 on two parallel arms, an upper arm 23 and a lower arm similar but not shown, pivoted to the plate 4. A rearward extension 25 of the arm 23 is hinged to an upwardly projecting release bar 26 pivoted to a release lever 27 hinged at 28 to a suitable bracket 29 projecting from a plate 30 mounted under the upper part of the casing. The lever 27 has a finger piece 31 with which it has a slotted connection.

Each latch bar 22 is provided with projecting studs, 32 adapted to engage with the notches 19 and 20 in the stop bars 9 and also with a retracting spring 33 tending to move it downward.

When any one of the numeral keys is depressed its elbow lever 15 is moved and its stop bar 9 is forced forward against the action of its spring 18 until its notch 20 has become disengaged from its stud 32 on the latch bar 22 and its notch 19 has become engaged with this same stud. Supposing that the operator begins pulling the main handle of the machine, as hereinafter described, finds that he should have depressed some other key of the same series. He then depresses such other key and its stop bar 9 is moved forward and its notch 20 engages its stud 32 on the same latch bar 22. When the summit 21 is reached, the stop bar 9 of the former key, under the influence of its spring 18 is at once retracted to its original position and its notch 19 again engages with its stud 32. In other words, if any key in a denominational series has been depressed, depressing any other key in the same series, not only positions the stop bar of the second key in its proper place, but automatically and merely as an incident of said depression, restores the key first depressed to its original position. If an item has been enumerated by the depression of a number of keys in different series and it is desired to restore the key in any series, or all the keys in the series in which they have been depressed, to their original positions and thus efface the item, the release lever 27 in any series desired is actuated by depressing its finger piece 31. This moves downwardly the rod 26 which lifts the arm 23 of the latch bar 22 so that the stud 32 on the latch bar which has engaged the notch 20 of the stop bar 9 of the depressed key of that series is disengaged therefrom and the key is restored to its original position.

The accumulating mechanism consists of numeral wheels and pinions and suitable connections. Each wheel 60 carries a pinion 61, and these pinions and wheels are mounted on a suitable frame, and by means not shown the frame is shifted to move the pinions to and from suitable rack and type plates.

The rotation of the numeral wheels is secured by the engagement of their pinions 61 with movable racks 80 provided for that purpose, and the extent of the movement of which in turn is governed by the keys which have been depressed. The racks 80 are cut in the upper front edges of vertical rack and type plates 81, each provided with a wing 82 which is adapted to carry the types (see Figs. 11 to 22). These wings extend rearwardly and are arranged to converge toward each other so that at the printing zone the spaces between them will correspond to that which usually obtains between successive figures of the font to which the types belong. Vertical rods 83 are arranged to serve as guides and supports for the plates 81, each rod resting in a recess formed in a transverse rib 84 at the base of the machine and at its upper end engaging with the transverse plate 30. Each plate 81 is provided with two guides 85 serving to retain the plate in engagement with its rod. The rods 83 are hollow and each contain a spring 86, the lower end of which is secured to a pin 88 passing through the guide 85 and plate 81 and the upper end of which is secured in a slit 89 by a pin 90. A vertical slot 58 in the rod permits the movement of the pin 88. Each plate 81 is provided at the lower part of its front edge with a projection 91, and at the lower part of its rear edge with another projection 92, the latter being adapted to engage with the universal bar 103 hereinafter described. The spring 86 normally tends to raise the plate 81 against the force of gravity. The racks 80 consist of teeth of proper size and shape to engage the pinions 61 of the numeral wheels 60.

95 is the main shaft of the machine (see Figs. 1 and 6), mounted in suitable bearings on the base 2 and adapted to be oscillated in any suitable manner, but preferably by a handle 96 terminating in a gripping member 97.

Suitable springs 122 secured to a rod 123 supported from the base of the machine and suitable connections 124 to the main shaft from such springs serve to retract the parts to their initial positions after actuation.

The adding, carrying, totalizing and resetting operations of the accumulating mechanism being fully described in said prior application of Lotterhand, and forming no part of this invention, will not be specifically described herein.

The printing or recording mechanism will now be described.

Each wing 82 of the rack and type plates 81 serves as a type carrier. Each wing is bent inwardly at 180 and downwardly at 181 (see Figs. 11 to 22), and is provided with a removable partition 183 forming a housing for the type. The internal member 180 is provided with a series of ten round openings 184 to permit of the passage of the type, and the partition 183 is provided with a similar series of ten oblong openings 185 for the same purpose, the two series of openings registering with each other horizontally.

The types 188 each comprise a round body 189 which is provided with grooves 190, a flattened shank 191 and a head 192, the latter carrying the figure to be printed, (see Fig. 13). A coiled spring 193, one end of which engages in the groove 190, and the other end of which impinges against the inner side of the member 180 and surrounds the type body, serves to retract the latter to position after actuation. The openings 185 are made with substantially straight vertical sides and the shanks 191 are flattened to correspond therewith in order to prevent the type from turning.

Type actuators 200 (see Figs. 2 and 23) are arranged in the front of the types, one for each denominational series. They each comprise a body 201 loosely mounted on a common shaft 202 and are spaced apart by suitable collars 203. Each body is provided with a recess 204, a catch 205, a beak 206 and an arm 207, extending toward the body of the next lower order, (see Figs. 23 and 6).

Arranged in the rear of and below the type actuators are a series of triggers 210 loosely mounted on a transverse shaft 211 and spaced apart by collars. Each trigger is provided with a spring 212 the other end of which is secured to a cross rod 199 mounted between brackets 213 (see Fig. 5). Each trigger has an upwardly extending arm 214 terminating in a roller 215 adapted to engage with the under surface of the corresponding rack and type plate 81, a downwardly extending arm 216 terminating in a hook 217 adapted to engage with the catch 205 on the type actuator 200, and a projection 218 adapted to strike against a cross rod 219 suitably mounted between two supplementary plates 220 and 221 mounted on and supported from the shafts 101 and 226. The shaft 211 is mounted between the two arms 102, fast on shaft 101, and which carry the universal bar 103. By this construction the triggers 210 can each turn on the shaft 211, but the entire series of triggers and the shaft 211 are adapted to oscillate on the shaft 101 as a whole.

Arranged in front of and below the parts just described are energizing elbow levers 225 each loosely mounted on a cross shaft 226 supported in brackets 227 from the base of the machine and spaced apart by suitable collars 228. The upper arm 229 of each lever 225 is provided with a roller 230 adapted to fit into the recess 204 of its corresponding actuator 200. Its lower arm 231 is bent away from the center of the machine and is provided with a spring 232 secured at a suitably fixed point in the base of the machine.

Supposing an item to have been enumerated by the depression of appropriate keys and the stop bars 9 to have been positioned thereby, the main shaft 95 is then oscillated by means of the handle 96 and the universal bar 103 is lifted in the manner previously described. This allows the appropriate rack and type plates 81 to rise under the influence of their respective springs and brings into position at the point of print the types corresponding to the keys which have been depressed. All of the remaining plates 81, whose keys have not been depressed, rise a slight distance to bring their respective "0" types to the point of print. Each plate 81 is similarly positioned at the "0" point whenever the main shaft is actuated. In the meantime, as each plate 81 rises its trigger 210 follows under the influence of its spring 212, its roller 215 remaining in contact with the lower edge of the plate 81 until the hook 217 engages with the catch 205, when the trigger 210 ceases to rotate on its shaft 211, and the whole series of such triggers are rotated together on the shaft 101 which movement in turn causes the actuators 200 to swing on their shafts 202 and their recess 204 to move against the rollers 230 and thus swing the levers 225 against the tension of their springs 232 thereby stretching the latter. As the rotation of each trigger 210 around the shaft 211 continues its projection 218 finally strikes the rod 219 and causes the trigger 210 to swing on its shaft 211 and disengages the hook 217 away from the catch 205, whereupon the energizer elbow lever 225 smartly propels the beak 206 of the actuator 200 against the shank 191 of the type immediately in front of it.

It will be observed by Fig. 23 that the recess 204 is formed of two walls, 1 and 6 that are disposed at an angle somewhat greater than a right angle. In Fig. 2 which shows the parts at rest in their normal position, the angular member or roller 230 carried by lever 225 is pressed by the spring 232 against both of these walls, and the line from the axis of this roller to the axis of the shaft 211 will pass through the apex of this angle. Hence the actuator 200 is held in this position by the spring lever, and if the actuator is moved in either direction, one of these walls will serve to retract the energizer, that will return the actuator to normal position when released. When the trigger 210 engages the actuator by its hook the wall 1 of the actuator will bear against the roller 230 to swing the energizer back and therefore tension its spring as shown in Fig. 23; and as soon as the trigger releases the actuator, by reason of its engagement with the bar 219, the energizer will impel the actuator against the type bar, to the position of Fig. 2. In this position it will be observed that the beak 206 of the actuator 200 is slightly off-set from the type. But as the actuator moves to this position from the position of Fig. 23, its momentum will carry it beyond this position to strike the type and advance it against the platen. But as the actuator 200 advances beyond the position of Fig. 2, the wall 1 of the recess 204 will shift the roller 230, that will now engage only the wall 6, it being understood that both of these walls engage the roller in the normal position of Fig. 2. The actuator being arrested upon the type striking the platen, the pressure of the roller on the wall 6 will cause the actuator to move back until the roller engages the wall 1 also of the recess, that is the actuator is retracted to normal position.

The inking mechanism comprises an inking ribbon which is carried upon spools and is brought into position in front of the line of print so that the types when propelled forward strike the ribbon and move it against the recording paper strip carried by the platen, as hereinafter described. The ribbon has a step by step movement from one spool to the other which movement is reversed automatically at the proper time, by any suitable means not herein set forth, and it has a vertical movement whereby it is elevated to the point of print when required, and depressed when not so required.

At convenient places near the rear of the machine and on either side of the printing section are two ribbon spool spindles 240 vertically placed and loosely mounted in suitable bearings in the base 2 and upper plate 30. Each spindle is reduced in cross section at a convenient point on which rests a ribbon spool 243 of usual form.

Means are provided for raising the ribbon 54 to bring it to the point of print at the proper time. Two brackets 213, previously referred to, are both rigidly secured to the shaft 101. Pivoted to and arranged between these brackets is a lifting frame 268 provided at its upper edge with two ways 269 with outwardly turned edges 56 adapted to embrace and guide the ribbon 54 which is wound upon the spools 243, (see Fig. 5). A downward extension 57 of the plate 30 serves as a lateral guide for the rack and type plates 81, and another extension 59 of the same plate serves as a guide for the upper end of the lifting frame 268.

The purpose of the lifter is to position the ribbon at the point of print each time an item is to be recorded and to remove it out of the way at other times. As above mentioned, the lifter is pivoted to the brackets 213 and is raised and lowered by the shaft 101 at each actuation of the main shaft. The parts are so arranged that the lifter is raised so as to bring the ribbon to the point of print at the extreme end of the forward stroke of the handle and after the actuators 200 have been moved forwardly to be in position to strike, so that the types are propelled forward at the instant when the ribbon is in position. As the rearward stroke of the handle begins the lifter is lowered and the ribbon is thereafter out of the way until the main shaft is again actuated.

It has been explained how at each actuation of the main shaft the universal bar 103 is lifted and the rack and type plates 81, corresponding to the denominations in which no key has been depressed, are raised to bring their "0" types opposite the point of print; because the parts are so proportioned that the beak of the hook 46 engages the projection 91 to bring the "0" type at the other end of the same plate 81 to the proper point. It has not been explained, however, how the zeros are automatically printed. This will now be done.

Each actuator 200 is provided with an arm 207, as above described, which extends over toward the body of the actuator of next lower order, so that when an actuator is moved its arm engages with the actuator of next lower order (provided the latter has not been already engaged by its own trigger 210) and bodily moves the latter to retract its energizer and be propelled toward its type when the trigger 210 of the first named actuator is released. Thus the rack and type plate 81 in each denomination where no key is depressed is automatically moved to bring its "0" type to the point of print and its actuator is automatically energized and propelled forward to print such type. In a similar manner any other actuator of lower order, the rack and type plate of which has been moved to the "0" printing point is actuated by the adjacent actuator of higher order, whether such adjacent actuator has been brought to the "0" point or to a point to print an integer.

The non-printing key comprises a key stem 410 having a finger piece 411 and a notch 412 (see Fig. 24). It is hinged at its lower extremity to one end of an elbow 413, the other end of which is pivoted to a lever 414 extending longitudinally of the machine and pivoted to a crank 420 on a cross shaft 415 which is adapted to oscillate a multiple detent 416 mounted between the two brackets 213 (see Figs. 2 and 23). This detent comprises a series of hooks 417 which are so positioned as to engage pins 418 projecting laterally from the arms 216 of the triggers 210 (see Figs. 3 and 4). It is obvious that when the key 410 is depressed the hooks 417 are oscillated into the paths of the pins 418 so as to intercept the triggers and detain them against movement. When they are so prevented from moving, the type actuators are not moved or energized and no printing operation can take place. The function of the printing mechanism is interrupted so long as the key 410 remains depressed. When the key 410 is released a spring 419 serves to retract it to its original position.

It is to be noted that in the above described mechanism, the parts are free from complication in construction and mode of operation; their movement is direct and positive and usually in straight lines; they can largely be made of standard material and without elaborate finishing processes; their operation requires little power, the key touch is light and the handle action does not induce undue fatigue. There is accomplished in this device everything accomplished in much more complicated machines, and in a more economical way, and the cost of its manufacture and use is necessarily less.

What is claimed in this invention is:—

1. A rack and type plate provided with a projection at a distance from the rack and in substantially the same plane therewith, and a second projection on the opposite edge of the rack and substantially in the same plane therewith, and a flange adapted to carry types in a different plane.

2. A series of type carriers, a series of type actuators one for each carrier, means for moving each actuator to energize it, means for releasing it after such energization, and devices, one carried by each actuator, adapted when its actuator is moved to move the adjacent actuator of lower order and to hold it until its actuator is released.

3. Two type actuators, one of higher and the other of lower order in denominational relation, each provided with an energizing spring, means for moving the actuator of higher order against the tension of its energizing spring, and a device carried by the actuator of higher order for similarly and automatically moving the actuator of lower order against its spring when it has not otherwise been so moved.

4. Two type actuators, one of higher and the other of lower order in denominational relation, each provided with an energizing spring, means for moving the actuator of higher order against the tension of its energizing spring, and a device carried by the actuator of higher order for similarly and automatically moving the actuator of lower order against its spring when it has not otherwise been so moved, comprising an arm on the actuator of higher order projecting over into the plane of the actuator of lower order.

5. A series of type actuators arranged in denominational order, means for moving each one of them independently, and an arm on each actuator extending into the plane of movement of its neighboring actuator of lower order, whereby when any actuator is moved all of the actuators of lower order are bodily moved.

6. A series of type carriers, a series of type actuators, means for moving all of the carriers automatically to a zero printing position, and means for moving any of them to numeral printing position, means for automatically moving the type actuator of any carrier moved to a numeral printing position an arm on each type actuator extending toward the right into the plane of movement of its adjacent actuator whereby when any type carrier is moved beyond a zero printing position the arm on its actuator bodily moves all of the type actuators of lower order thereof to coöperate with the type carriers at a zero printing position.

7. A series of type actuators, a series of triggers one for each actuator, means for moving each trigger separately, means for moving all of the triggers together as a series, a key on a keyboard, and means for preventing their movement, including a multiple detent operated by the key.

8. In a calculator, the combination with a printing mechanism arranged to print a plurality of characters side by side simultaneously, of a paper carriage to receive the impression and which is shiftable transversely to the line of such impression, means for so shifting the paper carriage automatically as each line is printed, an inking ribbon, a universal bar for controlling the printing mechanism, a shaft from which the universal bar is supported, an arm fast on said shaft, and a guide member carried on said arm and arranged to support the ribbon to shift it to the printing position at each operation of the universal bar.

9. The combination of a series of type actuators, a series of triggers one for each actuator, an abutment on each trigger, means for moving the triggers separately, means for moving the triggers simultaneously, a multiple detent provided with a series of hooks each arranged to engage the abutment portion of a trigger, and a controlling key connected with the detent to shift the detent to engage the triggers and hold them away from position for engagement with the actuators.

10. In a calculator, the combination of a series of type actuators, a series of triggers one for each actuator, an abutment on each trigger, means for shifting the triggers simultaneously at each operation of the machine, means for controlling such movement of the triggers individually to cause the movement to engage some of the triggers with the actuators, a multiple detent having a series of hooks arranged to engage said abutments respectively, and a key connected with the detent to shift it to engage the triggers and thereby prevent all of the triggers in their simultaneous movement from engagement with the actuators.

11. In a calculator, the combination of a series of type actuators, a series of triggers one for each actuator, an abutment on each trigger, a frame on which the triggers are pivoted that is movable to bodily shift the triggers simultaneously to thereby bring the triggers to engage the actuators, means for moving the triggers individually on their pivots to control their engagement with their actuators, a multiple detent mounted to swing on said frame and provided with hooks arranged to engage said abutments respectively, and a key connected with the detent to shift the detent on the frame to engage the triggers and hold them from engagement with their actuators upon movement of the frame.

12. In a calculator, the combination of a series of type carriers, a series of actuators one for each carrier, a series of triggers one for each actuator and arranged to engage the respective carrier, an abutment on each trigger, whereby the triggers are bodily moved simultaneously, said triggers being prevented by the type carriers when in normal position from engagement with the actuators upon movement by said means, but permitted to engage the actuators upon advancement of the type carriers to a printing position, a multiple detent having hooks arranged to engage said abutments respectively, and a key connected with the detent to shift it to thereby engage the triggers and prevent their engagement with the actuators upon movement of the triggers.

13. In a calculator, the combination of a series of type carriers, a series of actuators one for each carrier, a series of triggers one for each actuator and arranged to engage the respective carrier, an abutment on each actuator, a movable frame on which all of the triggers are pivoted whereby the triggers are bodily moved simultaneously, said triggers being prevented by the type carriers when in normal position from engagement with the actuators upon movement of said frame, but permitted to engage the actuators upon advancement of the type carriers to a printing position, a multiple detent pivoted on the frame and provided with hooks arranged to engage said abutments respectively, and a key connected with the detent to shift it to thereby engage the triggers and prevent their engagement with the actuators upon movement of the frame.

14. In a calculator, a series of type carriers, a series of type actuators coöperating therewith, a corresponding series of energizing levers, a spring for each lever, and a series of triggers each arranged to move one of the actuators against its lever to charge the spring thereof to impel the actuator when released from the trigger, said triggers being controlled by the respective type carriers.

15. In a calculator, a series of type carriers, a series of type actuators coöperating therewith, a corresponding series of energizing levers, a spring for each lever, and a series of triggers each arranged to move one of the actuators against its lever to charge the spring thereof to impel the actuator when released from the trigger, said triggers being engaged by the respective type carriers in the normal position of the carriers to prevent the triggers engaging their actuators and the triggers being released upon advance of the carrier to a printing position to permit engagement with the actuators.

16. In a calculator, a series of type carriers, a series of type actuators coöperating therewith, a corresponding series of energizing levers, a spring for each lever, a universal bar controlling the type carriers, a frame rigidly connected with said bar, a series of triggers pivoted on said frame and each adapted for engagement with one of the said actuators as the triggers are bodily advanced by the frame, said triggers being independently movable on the frame and normally engaged with the type carriers respectively thereby preventing their engagement with the actuators in the normal position of the carriers, but released to engage a respective actuator upon any type carrier being advanced to printing position.

17. In a calculator, a series of type carriers, a series of type actuators coöperating therewith, a corresponding series of energizing levers, a spring for each lever, a universal bar controlling the type carriers, a frame rigidly connected with said bar, a series of triggers pivoted on said frame and each adapted for engagement with one of the said actuators as the triggers are bodily advanced by the frame, said triggers being independently movable on the frame and normally engaged with the type carriers respectively and thereby preventing their engagement with the actuators in the normal position of the carriers, but released to engage a respective actuator upon any type carrier being advanced to printing position; and a stop bar arranged to be engaged by the triggers as advanced by their frame and trip them from the actuators.

18. In a calculator, a series of type carriers, a series of type actuators coöperating therewith, a corresponding series of energizing levers, a spring for each lever, a series of triggers each arranged to move one of the actuators against its lever to charge the spring thereof to impel the actuator when released from the trigger, means for bodily advancing the triggers to bring them to engage the actuators, and means for releasing the triggers from the actuators during their advancement.

19. In a calculator, the combination of a type actuator, and an energizer lever therefor, the lever having an annular portion, and the actuator having a recess with two angular walls that jointly maintain the actuator in normal position, and which walls are independently operative to cause the lever to swing the actuator in opposite directions.

20. In a calculator, the combination of a type actuator, and an energizer lever therefor, the lever having an annular portion, and the actuator having a recess with two angular walls located on opposite sides of the axis of the actuator that jointly maintain the actuator in normal position, and which walls are independently operative to cause the lever to swing the actuator in opposite directions.

21. In a calculator, a series of printing members arranged to make an impression when retracted and released, a series of triggers arranged to engage the printing members respectively, a movable support on which the triggers are mounted for independent relative movement, means for swinging the support to cause the triggers to retract the printing members, and means whereby during such movement of the support the triggers are swung on the support to release the printing members and permit their impression movement.

22. In a calculator, a series of printing members arranged to make an impression when retracted and released, a series of triggers arranged to engage the printing members respectively, a movable support on which the triggers are mounted for independent relative movement, means for swinging the support to cause the triggers to retract the printing members, means whereby during such movement of the support the triggers are swung on the support to release the printing members and permit their impression movement, and selective means for the printing members arranged to control the engagement of the respective triggers with their printing members.

23. In a calculator, a series of printing members arranged to make an impression when retracted and released, a series of triggers arranged to engage the printing members respectively, a movable support on which the triggers are mounted for independent relative movement, means for swinging the support to cause the triggers to retract the printing members, means for normally holding all of the triggers out of position for engagement with the printing members during the swinging of the support, selective means arranged to free the triggers individually from said holding means to permit their engagement with the printing members, and means whereby during such movement of the support the triggers are swung on the support to release the selected triggers from the retracted printing members and permit their impression movement.

24. In a calculator, a series of printing members including rack plates arranged to make an impression when retracted and released, a series of triggers arranged to engage the printing members respectively, a movable support on which the triggers are mounted for independent relative movement, means for swinging the support to cause the triggers to retract the printing members, and means whereby during such movement of the support the triggers are swung on the support to release the printing members and permit their impression movement, said rack plates having means to control the engagement of the respective triggers with their printing members.

25. In a calculator, a series of printing members including rack plates arranged to make an impression when retracted and released, a series of triggers arranged to engage the printing members respectively, a movable support on which the triggers are mounted for independent relative movement, means for swinging the support to cause the triggers to retract the printing members, the rack plates having means that normally hold all of the triggers out of position for engagement with the printing members during the swinging of the support, and upon advance of the rack plates said means will serve to free the coöperating triggers to permit their engagement with the printing members, and means whereby during such movement of the support the triggers are swung on the support to release the selected triggers from the retracted printing members and permit their impression movement.

26. In a calculator, a series of printing members arranged to make an impression when retracted and released, a series of triggers arranged to engage the printing members respectively, a movable support on which the triggers are mounted for independent relative movement, means for swinging the support to cause the triggers to retract the printing members, and a fixed stop bar positioned to be engaged by the triggers whereby during such movement of the support the triggers are swung on the support to release the printing members and permit their impression movement.

27. In a calculator, a series of printing members arranged to make an impression when retracted and released, a series of triggers arranged to engage the printing members respectively, a movable support on which the triggers are mounted for independent relative movement, means for swinging the support to cause the triggers to retract the printing members, means for normally holding all of the triggers out of position for engagement with the printing members during the swinging of the support, selective means arranged to free the triggers individually from said holding means to permit their engagement with the printing members, and a fixed stop bar positioned to be engaged by the triggers whereby during such movement of the support the triggers are swung on the support to release the selected triggers from the retracted printing members and permit their impression movement.

ADDOMETER CORPORATION.
GEORGE B. WILKINSON,
*President.*

Copies of this patent may be obtained for five cents each, by addressing the "Commissioner of Patents, Washington, D. C."